Aug. 6, 1968   G. HAUFLER ET AL   3,395,630
CAMERA FOR USE WITH ARTIFICIAL-LIGHT FILM
Filed July 6, 1965   2 Sheets-Sheet 2
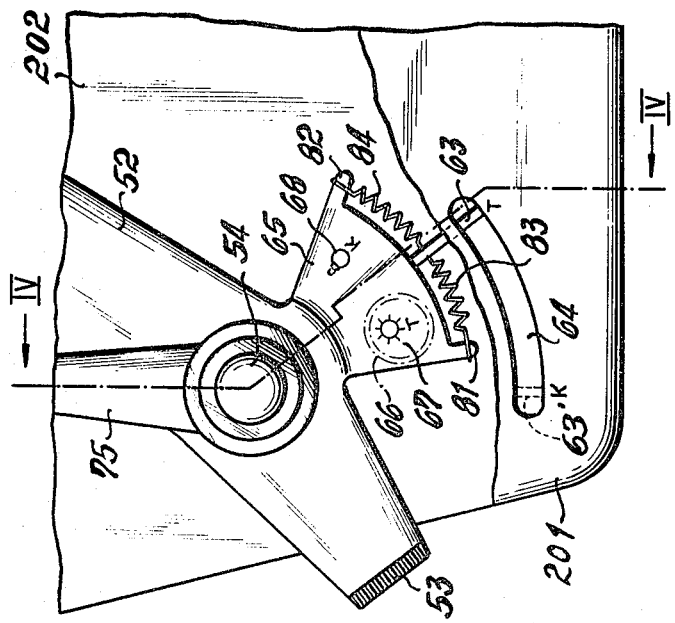
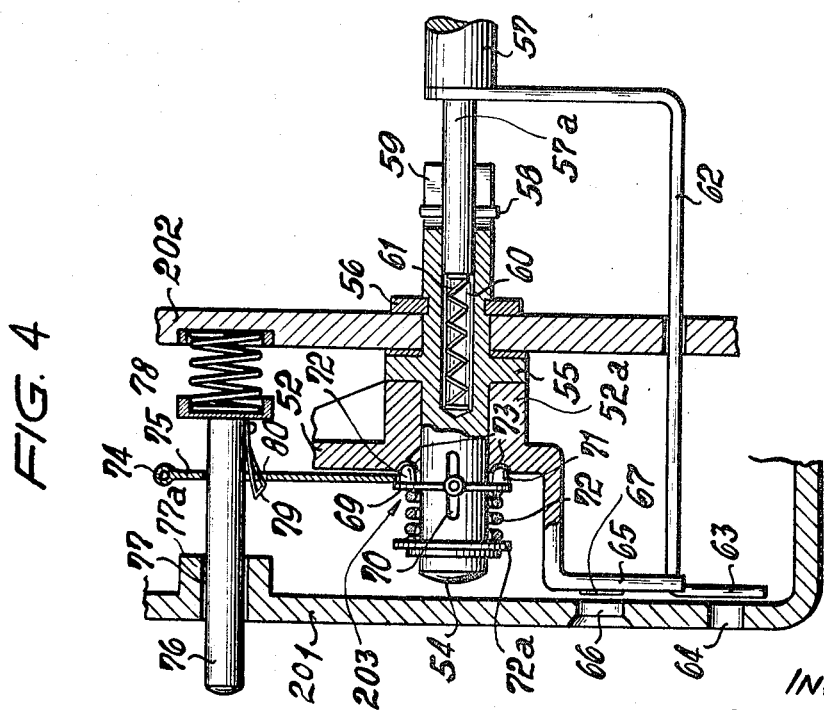
INVENTORS:
GERHARD HAUFLER
ALBERT SCHNELL
FRIEDRICH SCHWEIKHARDT
BY
Michael J. Striker
their ATTORNEYS United States Patent Office 3,395,630
Patented Aug. 6, 1968

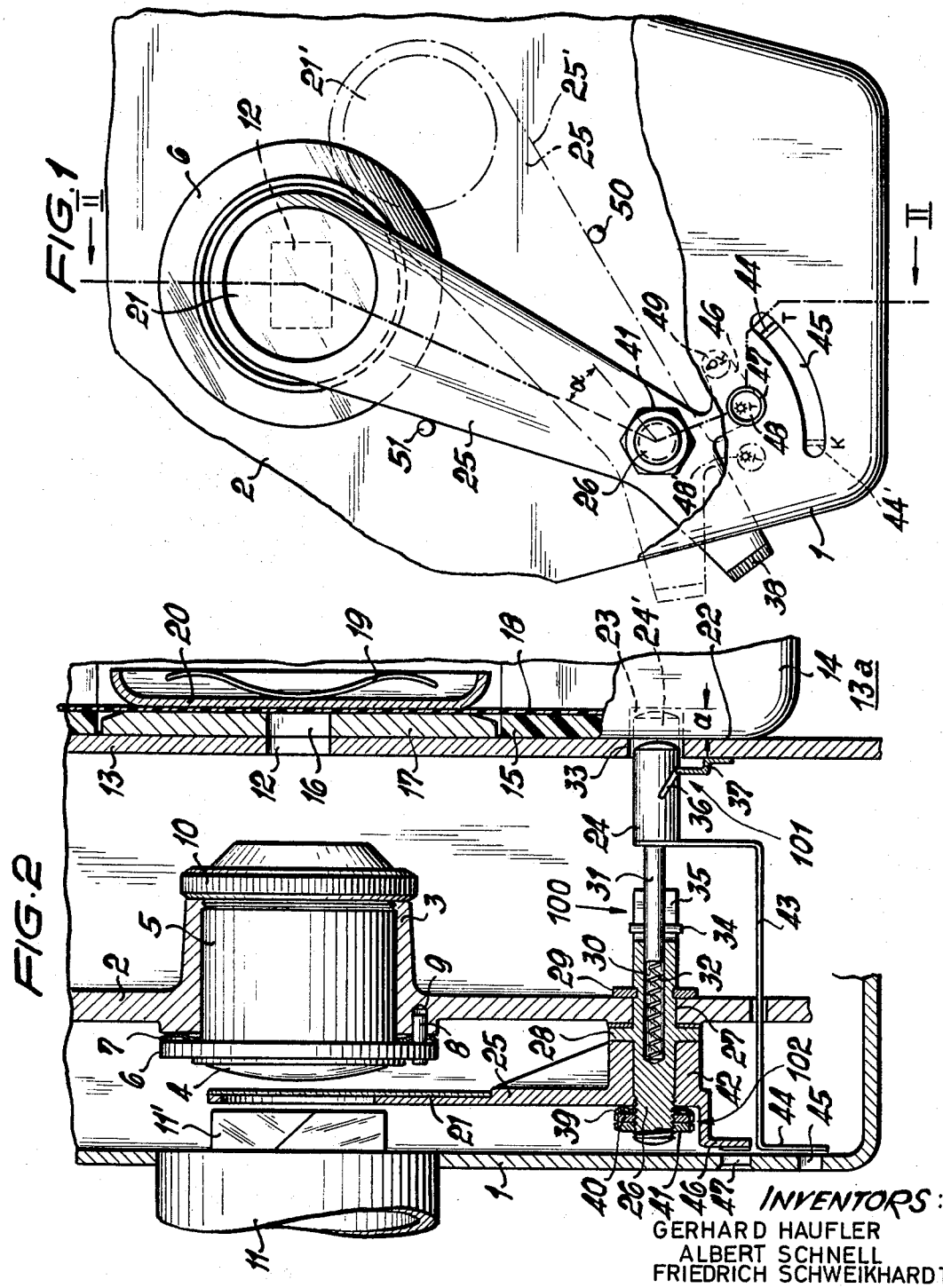

3,395,630
CAMERA FOR USE WITH ARTIFICIAL-LIGHT FILM
Gerhard Haufler, Stuttgart-Sonnenberg, Albert Schnell, Stuttgart-Wurttemberg, and Friedrich Schweikhardt, Warmbronn, Wurttemberg, Germany, assignors to Eugen Bauer GmbH, Stuttgart - Unterturkheim, Germany
Filed July 6, 1965, Ser. No. 469,750
Claims priority, application Germany, July 7, 1964, B 77,555
21 Claims. (Cl. 95—11)

ABSTRACT OF THE DISCLOSURE

A movie camera for use with lamplight film which is furnished in two types of magazines. A single corrective filter is moved across the path of incident light when one of the magazines is inserted into the housing of the camera to permit exposures in daylight. The filter is movable by hand into and from the path of incoming light so that the camera can be used in daylight or artificial light regardless of which magazine is inserted into the housing. The mechanism for moving the filter independently of the one magazine is installed in the camera.

---

The present invention relates to cameras in general, and more particularly to still cameras or movie cameras for use with artificial-light film, also called lamplight film. Still more particularly, the invention relates to improvements in cameras of the type wherein a corrective filter is moved into a plane which intersects the path of incoming light when the user wishes to make an exposure in daylight.

Cameras of the class to which our present invention pertains may accommodate two types of magazines or cartridges, namely, so-called daylight magazines and so-called artificial-light or lamplight magazines. Both types contain photographic film which is produced for exposure in artificial light; therefore, the camera is provided with a corrective filter which is moved in front of that film frame which is momentarily located behind the lens whenever the user decides to make one or more exposures in daylight. The arrangement is preferably such that a properly inserted daylight magazine automatically causes or allows movement of the corrective filter into a plane which intersects the optical axis so that the user can disregard the filter when he decides to insert a daylight magazine for the purpose of taking pictures in daylight. Analogously, a properly inserted lamplight magazine will automatically cause or allow the filter to move or to remain out of registry with the lens so that the user knows again that the filter is out of the way and that the camera is ready to take pictures in artificial light.

Of course, the aforementioned corrective filter is necessary only if the nature, particularly the spectral sensitivity, of photographic film in a daylight or lamplight magazine is such that the film cannot be used with equal advantage for exposures in daylight as well as for exposures in artificial light. As a rule, the spectral sensitivity of film is such that it corresponds to spectral composition of artificial light and, therefore, such film cannot be used with equally satisfactory results for making exposures in daylight unless the camera comprises a corrective filter which is placed into the path of incoming light and whose composition is such that it can compensate for differences between the spectral composition of daylight and artificial light.

A serious drawback of all hereinabove described conventional cameras is that the user cannot make exposures in daylight when the film chamber of the camera accommodates a lamplight magazine, and that the user is equally unable to make exposures in artificial light when the film chamber contains a daylight magazine. In other words, the type of magazine in the film chamber is the sole determining factor which controls whether or not the film can be exposed in daylight or in artificial light. Consequently, the user is unable to take pictures in daylight unless he removes a lamplight magazine and replaces it with a daylight magazine; otherwise, the user will take daylight pictures which are of inferior quality because the incoming light does not pass through the corrective filter. Analogously, pictures taken in lamplight will be unsatisfactory whenever an exposure is made while the film chamber of the camera contains a daylight magazine.

Accordingly, it is an important object of the present invention to provide a camera for use with lamplight film which is constructed and assembled in such a way that the user is always in a position to switch from taking pictures in daylight to taking pictures in artificial light, or vice versa, regardless of whether the film chamber of the camera accommodates a daylight magazine or a lamplight magazine.

Another object of the invention is to provide a camera of the just outlined characteristics wherein the position of the corrective filter may be changed automatically, i.e., in response to insertion or removal of a magazine, and also by hand so that it is entirely up to the user whether or not the camera should be set for exposures in daylight or in artificial light.

A further object of our invention is to provide a camera wherein the corrective filter automatically returns to such position which reflects the type of magazine in the film chamber, even if the user has previously moved the filter into registry with the lens despite the fact that the film chamber happens to accommodate a lamplight magazine.

An additional object of the invention is to provide a camera for use with lamplight film wherein the momentary position of the corrective filter may be determined at all times, also at the time when the user decides to manually select the position of the filter, and wherein the user can also obtain readings which indicate the nature of magazine in the film chamber.

Still another object of the invention is to provide a novel operative connection between the corrective filter and a daylight magazine or a lamplight magazine in a camera of the above outlined characteristics.

A concomitant object of the invention is to provide a novel automatic resetting mechanism which will invariably return the corrective filter to such position which corresponds to the type of magazine in the film chamber as soon as the user completes a single exposure or a series of consecutive exposures.

A further object of our present invention is to provide a still camera or movie camera wherein the provision of manually actuatable means for changing the position of the corrective filter adds little, if anything, to the overall dimensions of the camera and wherein manual changes in the position of the filter may be carried out by exertion of a negligible force.

An additional object of the invention is to provide a camera wherein automatic resetting of the corrective filter subsequent to manual displacement of the filter from its automatically selected position requires no separate operation so that such resetting of the filter will take place in response to a manipulation or step which is incidental to or absolutely necessary for taking a picture.

An ancillary object of the invention is to provide a novel operative connection between the trigger of a still camera or movie camera and the mechanism which automatically resets the corrective filter subsequent to manual displacement of the filter from a position which was selected in a fully automatic way in response to insertion of a daylight or lamplight magazine into the film chamber.

A further object of the invention is to provide a camera of the above outlined characteristics wherein the readings indicative of the automatically selected and of the actual position of the corrective filter may be obtained at a glance and by looking at the same side of the camera, preferably by observing a pair of windows which are immediately adjacent to each other.

Another object of the invention is to provide an improved camera of the above outlined type wherein the mechanism which controls and/or transmits automatic and non-automatic movements of the corrective filter is of very simple, rugged and relatively inexpensive construction, and wherein such mechanism is not likely to be damaged or destroyed by an inexperienced operator.

Briefly stated, one feature of our invention resides in the provision of a movie camera or still camera for use with film which is intended for exposure in artificial light and is furnished in two types of film magazines, namely, in so-called daylight magazines and in so-called lamplight magazines. The camera comprises a housing defining a film chamber arranged to accommodate a supply of film and having a light-admitting aperture, a corrective filter which is movable between two positions in one of which it is located in front of and in the other of which it is moved away from and out of registry with the aperture, motion transmitting means for automatically moving or holding the filter in front of the aperture in response to insertion of a daylight magazine into the film chamber, and manually operated means for moving the filter into or away from registry with the aperture at the will of the user, i.e., independently of the motion transmitting means. Thus, when the film chamber contains a supply of film which is accommodated in a lamplight magazine whereby the motion transmitting means automatically moves the filter away from registry with the light-admitting aperture, the user may move the filter in front of the aperture so that the camera is ready to take pictures in daylight. Inversely, the user may move the filter away from registry with the aperture when the film chamber contains a supply of film which is stored in a daylight magazine if the camera is to be used for taking of pictures in artificial light.

The novel features which are considered as characteristic of the invention are set forth in particular in the appended claims. The improved photographic camera itself, however, both as to its construction and the mode of manipulating the same, together with additional features and advantages thereof, will be best understood upon perusal of the following detailed description of certain specific embodiments with reference to the accompanying drawings, in which:

FIG. 1 is a fragmentary front elevational view of a movie camera which embodies one form of our invention, the front wall of the camera housing being partially broken away and certain movable component parts being shown in two different positions;

FIG. 2 is a vertical section substantially as seen in the direction of arrows from the line II—II of FIG. 1;

FIG. 3 is a fragmentary front elevational view of a modified movie camera; and

FIG. 4 is a section substantially as seen in the direction of arrows from the line IV—IV of FIG. 3.

Referring first to FIGS. 1 and 2, there is shown a movie camera whose housing comprises a cap-shaped front wall 1 located in front of and spaced from a first vertical partition 2 constituting a support for a lens 4. The mount 5 of the lens 4 is slidable in a bearing sleeve 3 shown as forming part of the partition 2. The front end portion of the lens mount 5 carries an annular flange 6 for a spring washer 7 which abuts against the front face of the partition 2. The flange 6 also carries a locating pin 8 which extends into a bore 9 provided in the partition 2. The threaded rear end portion of the lens mount 5 carries a knurled adjusting ring or knob 10 which may be rotated to move the lens 4 in the longitudinal direction of the optical axis.

The front wall 1 supports a tubular shield 11 which is located in front of and admits light to the lens 4. A prism 11' which is installed between the lens 4 and shield 11 serves to deflect a certain amount of light to the viewfinder of the camera and/or to the photosensitive resistor or cell of an exposure control, not shown.

The partition 2 is spaced from and is located in front of a second partition or intermediate wall 13 having a light-admitting aperture 12 which registers with the opening defined by the shield 11. The second partition 13 constitutes the front wall of a film chamber 13a which accommodates a removable film cartridge or magazine 14. The front panel 15 of the magazine 14 abuts against the rear side of the partition 13 and is provided with a relatively large cutout for an aperture plate 17 having an aperture 16 which is immediately adjacent to and registers with the aperture 12 of the partition 13. The plate 17 serves as a guide for the front side of a photographic film 18 a certain length of which is held against the rear face of the plate 17 by a pressing plate 20, the latter being biased by a leaf spring 19. The film 18 is of the type which is used to make exposures in artificial light and is advanced in a well-known manner (not shown) to be paid out by a first reel or spool and to accumulate on a second reel or spool.

The film 18 has a certain light sensitivity, and such film is being sold in two types of magazines, namely, in so-called daylight magazines and in so-called lamplight or artificial-light magazines. When the film 18 is used for making exposures in daylight, a corrective filter 21 must be placed in front of the aperture 12 so that its plane intersects the optical axis; however, when the film 18 is used for making exposures in artificial light, the filter 21 must be moved out of the path of light rays which come from a subject or scene and pass in the direction of the optical axis, first through the opening of the tubular shield 11, thereupon through the lens 4, and finally through the registering apertures 12 and 16. In the illustrated embodiment, the corrective filter 21 is mounted in a plane which is located in front of the lens 4.

The magazine 14 is of the daylight type and is provided with means for automatically moving the filter 21 in front of the lens 4 when the front panel 15 abuts against the rear side of the second partition 13 and the aperture 16 registers with the aperture 12. If the magazine 14 is replaced by an artificial-light or lamplight magazine, the filter 21 is caused or allowed to automatically move away from registry with the lens 4 and apertures 12, 16.

The means for automatically moving the filter 21 to the solid-line position of FIG. 1, i.e., in front of the lens 4, simply comprises a flat portion 22 of the front surface on the panel 15 of the daylight magazine 14. This flat portion 22 turns the filter 21 through the intermediary of a motion transmitting assembly including an axially movable sensing pin 24 which is reciprocable in a through bore 33 provided in the second partition 13. The arrangement is such that the flat portion 22 of the front panel 15 depresses the sensing pin 24 against the bias of a helical return spring 32 whereby such axial displacement of the pin 24 brings about a counterclockwise angular displacement of the filter 21 from the phantom-line position 21' to the solid-line position of FIG. 1.

If the magazine 14 is replaced by a lamplight magazine, the sensing pin 24 is allowed to follow the bias of the return spring 32 and moves to the phantom-line position 24' of FIG. 2 in which it extends into a recess shown as a blind bore 23 provided in the front panel of the lamplight magazine. Save for the provision of the recess 23 which is shown in FIG. 1 by phantom lines, the lamplight magazine may be identical with the daylight magazine 14.

The aforementioned automatic motion transmitting assembly further comprises an elongated carrier 25 one end of which supports the filter 21 and a median portion of which is provided with a cylindrical hub 42 rotatable on a shaft 26 which is coaxial with the sensing pin 24. The shaft 26 is rotatable in a through bore 27 of the first partition 2 and has an annular collar or stop 28 which is adjacent to the front side of this partition. A split ring 29 extends into a circumferential groove of the shaft 26 and is adjacent to the rear side of the partition 2 so that the shaft 26 can rotate but is held against axial movement.

A median portion of the shaft 26 is formed with an axially extending blind bore 30 which accommodates the return spring 32 and which also receives the front end portion of a smaller-diameter extension 31 forming the foremost part of the sensing pin 24. As stated before, the spring 32 tends to maintain the pin 24 in the phantom-line position 24' of FIG. 2 and the pin 24 is free to assume such position 24' when the daylight magazine 14 is removed or when the magazine 14 is replaced by a lamplight magazine.

The shaft 26 is connected for rotation with the sensing pin 24 by a readily disengageable coupling 100 which includes a radially extending diametral stud 34 on the extension 31 and a transverse diametral slot 35 provided in the rearmost portion of the shaft 26. The stud 34 is received in and is movable longitudinally of the slot 35 so that the coupling 100 is operative in each axial position of the sensing pin 24, as long as the stud 34 remains in the slot 35.

The motion transmitting assembly between the flat portion 22 of the front panel 15 and the corrective filter 21 further comprises a second coupling 101 which causes the sensing pin 24 to rotate in response to axial movement between the solid-line position and the phantom-line position 24' of FIG. 2. The coupling 101 includes a rigid follower or finger 37 which is fixed to the front side of the second partition 13 and has a free end portion or tang which extends into a helical cam groove 36 provided in the periphery of the sensing pin 24. It will be readily understood that the pin 24 will be compelled to rotate whenever it moves axially (under the bias of the return spring 32 or in response to insertion of the daylight magazine 14) and that the coupling 100 transmits such rotation to the shaft 26 which in turn moves the filter 21 between the solid line position and the phantom-line position 21' of FIG. 1. In other words, the couplings 100 and 101 together constitute a device for transforming axial movement of the sensing pin 24 into angular movement of the shaft 26 and corrective filter 21. The lead of the cam groove 36 is such that the filter 21 describes an angle alpha when the sensing pin 24 covers an axial distance $a$. The front wall 1 or the first partition 2 carries two fixed stop pins 50, 51 (see FIG. 1) which arrest the carrier 25 in the respective end positions.

In accordance with a highly advantageous feature of our invention, the angular position of the filter 21 may be changed independently of the sensing pin 24. In order to allow for such independent turning of the filter 21, the motion transmitting assembly between the carrier 25 and the sensing pin 24 comprises a friction clutch 102 which is operative between the shaft 26 and the hub 42. The clutch 102 includes a resilient washer here shown as a dished spring 39 which surrounds the externally threaded front end portion of the shaft 26 and bears against the front end face of the hub 42, and a nut 40 which meshes with the shaft 26 and serves to select the bias of the washer 39. A lock nut 41 is provided to fix the nut 40 in selected angular position. The carrier 25 resembles a two-armed lever whose longer projection or arm supports the filter 21 and whose shorter projection or arm extends from the camera housing and is provided with a knurled, milled or otherwise roughened tip 38 which may be engaged by hand to turn the carrier 25 between the solid-line position and the phantom-line position 25' of FIG. 1. In turning the carrier 25, the operator must overcome the friction between the washer 39 and hub 42. The shorter projection or arm of the carrier 25 constitutes an actuating device which can move the filter 21 into or out of registry with the apertures 12 and 16.

The indicating means for automatically pinpointing the axial position of the sensing pin 24 comprises an elongated pointer or hand 43 which is rigidly secured to the pin 24 and has a bent-over front end portion 44 located behind an arcuate window 45 provided in the front wall 1. The graduation or symbol T shown in FIG. 1 below the window 45 registers with the end portion 44 of the pointer 43 when the film chamber 13a accommodates a daylight magazine 14. The end portion 44 will move to the phantom-line position 44' and will register with a symbol K below the window 45 when the daylight magazine 14 is removed from the chamber 13a or when this chamber accommodates a lamplight magazine having in its front panel a recess corresponding to the recess 23 shown in FIG. 2.

The cameras of FIGS. 1 and 2 is further provided with indicating means for automatically pinpointing the actual position of the filter 21. The median portion of the carrier 25 comprises a projection or lug 46 which constitutes a dial and is located behind a second window 47 in the front wall 1. This second window 47 resembles a circular opening and may register with one of two symbols or graduations 48, 49 on the front face of the dial 46. The symbol 48 includes the letter T and a representation of the sun so that, when this symbol 48 is located behind the window 47 (as actually shown in FIGS. 1 and 2 by solid lines), the operator knows that the filter 21 is disposed between the prism 11' and the lens 4, i.e., that the camera is ready to take pictures in daylight regardless of whether the film chamber 13a accommodates a daylight magazine 14 or a lamplight magazine. The symbol 49 includes the letter K and the representation of a flash bulb so that, when this symbol registers with the window 47, the operator knows that the filter 21 is moved to the phantom-line position 21' and that the camera is ready to take pictures in artificial light regardless of whether the chamber 13a accommodates a daylight magazine 14 or a lamplight magazine.

The provision of the second indicating means including the window 47 and the dial 46 is of importance because the carrier 25 may be turned independently of the shaft 26 when the operator engages the tip 38. In other words, the angular position of the pointer 43 indicates to the operator that the chamber 13 is empty, that the chamber 13a contains a daylight magazine 14, or that this chamber contains a lamplight magazine; however, the angular position of the pointer 43 need not always be truly indicative of the angular position of the filter 21.

The camera of FIGS. 1 and 2 is manipulated as follows:

If the film chamber 13a is empty, the sensing pin 24 is free to follow the bias of the return spring 32 and moves to the phantom-line position 24'. The end portion 44 of the pointer 43 then assumes the phantom-line position 44' of FIG. 1 and registers with the symbol K below the window 45, thus indicating to the operator that the carrier 25 can be assumed to be in the phantom-line position 25' of FIG. 1, i.e. that the filter 21 is not located in front of the lens 4. Of course, the fact that the end portion 44 of the pointer 43 registers with the symbol K below one end of the window 45 does not necessarily mean that the filter 21 is actually in the phantom-line position 21' because the carrier 25 may be turned by hand. However, under normal circumstances, the symbol 49 on the dial 46 will be located behind the window 47 when the end portion 44 of the pointer 43 assumes the phantom-line position 44' of FIG. 1. The symbol 48 then assumes the phantom-line position 48' of FIG. 1. However, and regardless of the actual position of the filter 21, the user can determine at a glance that the chamber 13a contains a daylight magazine 14 if the end portion 44 of the pointer 43 registers with the symbol T below the window 45. Analogously, the user will know that the chamber 13a is empty or that this chamber contains a lamplight magazine if the end portion 44 of the pointer 43 assumes the end position 44'.

If the user inserts a lamplight magazine, i.e., if the magazine which is inserted into the film chamber 13a comprises a front panel having a recess 23, the axial and angular positions of the sensing pin 24 remain unchanged so that the symbol 49 remains in registry with the window 47 and the end portion 44 of the pointer 43 remains in the phantom-line position 44'. The user then knows that the camera is ready for taking pictures in artificial light. Should the user decide to take pictures in daylight, all he has to do is to engage the tip 38 and to turn the carrier 25 in a counterclockwise direction, as viewed in FIG. 1, so that the filter 21 moves to the solid-line position and is located in front of the lens 4. Upon such manipulation of the tip 38, the user must disregard the position of the pointer 43 because it is misleading, i.e., only the window 47 must be observed and this window then registers with the symbol 48 to indicate that the filter 21 is located in front of the lens 4 whereas the end portion 44 of the pointer 43 remains in the phantom-line position 44'. During turning of the carrier 25 in response to exertion of finger pressure against the tip 38, the user must overcome friction between the washer 39 and hub 42 because the angular position of the shaft 26 and the angular position of the sensing pin 24 remains unchanged.

If the lamplight magazine is replaced by a daylight magazine 14, the flat portion 22 of the front panel 15 automatically depresses the sensing pin 24 against the bias of the return spring 32 whereby the coupling 101 compels the pin 24 to rotate and the coupling 100 compels the shaft 26 to share such angular movement and to turn the carrier 25 in a sense to move the filter 21 in front of the lens 4 (it being assumed, of course, that prior to insertion of the daylight magazine 14 the carrier 25 was located in the phantom-line position 25' of FIG. 1). In other words, axial movement of the sensing pin 24 from the phantom-line position 24' to the solid-line position of FIG. 2 will cause angular movement of the filter 21 in a counterclockwise direction, as viewed in FIG. 1, and the extent of such angular movement is indicated by the angle alpha. The window 47 then registers with the symbol 48 and the end portion 44 of the pointer 43 registers with the symbol T below the arcuate window 45.

If he wishes to take pictures in artificial light, the user simply exerts pressure against the tip 38 to turn the carrier 25 in a clockwise direction, as viewed in FIG. 1, so that the filter 21 assumes the phantom-line position 21' and allows light rays to pass from the prism 11' directly into the lens 4. The finger pressure then overcomes friction between the washer 39 and hub 42.

In order to avoid mistakes, the user will check the position of the pointer 43 and the position of the dial 46 prior to insertion of a fresh magazine into the film chamber 13a. When the chamber 13a is empty, the end portion 44 of the pointer 43 should assume the phantom-line position 44' of FIG. 1 and the window 47 should register with the symbol 49 of the dial 46.

The position of the stud 34 and slot 35 may be reversed, i.e., the slot 35 may be provided on the front portion of the sensing pin 24 and the stud 34 is then rigid with the rear end portion of the shaft 26. In such constructions, the spring 32 may be placed into a bore of the sensing pin or this spring may be replaced by a spring which is connected to the housing of the camera and biases the pin 24 to the phantom-line position 24'.

Referring to FIGS. 3 and 4, the carrier for the corrective filter 21 (not shown) is indicated by the numeral 52. This carrier again resembles a two-armed lever the upwardly extending arm of which supports the corrective filter and the shorter arm of which is provided with a knurled tip 53 extending from the camera housing and being turnable by hand so as to move the filter into or out of registry with the lens. The hub 52a of the carrier 52 is rotatably supported by a shaft 54 which corresponds to the shaft 26 of FIGS. 1 and 2. The shaft 54 is rotatable in the first partition 202 and comprises a collar or stop 55 which abuts against the front side of this partition. The shaft 54 also carries a split ring 56 which cooperates with the collar 55 to hold the shaft against axial movement. The operative connection between the sensing pin 57 and the shaft 54 is practically identical with the connection between the shaft 26 and sensing pin 24 of FIGS. 1 and 2. Thus, the pin 57 comprises a smaller-diameter extension 57a which is slidable in the blind bore 60 of the shaft 54 and is biased by a return spring 61. The extension 57a carries a diametral stud 58 which extends into a diametral slot 59 at the rear end of the shaft. The coupling which causes the sensing pin 57 to rotate in response to axial displacement is not shown in FIGS. 3 and 4.

The sensing pin 57 is connected with an elongated pointer or hand 62 whose bent-over front end portion 63 is located behind an arcuate window 64 provided in the front wall 201 of the camera housing. The end portion 63 registers with one of the symbols K and T which are provided on the exposed surface of the front wall 201 and respectively indicate that the filter is located out of registry with or in front of the lens. The carrier 52 is rigid with a projection or dial 65 which carries two symbols 67, 68 respectively corresponding to the symbols 48, 49 shown in FIG. 1. The symbol 67 registers with a second window 66 in the front wall 201 when the filter is located in front of the lens, and the symbol 68 will register with the window 66 when the camera is ready to take pictures in artificial light.

The structure of FIGS. 3 and 4 further comprises a disengageable resetting clutch 203 which is effective only when the carrier 52 assumes one of its end positions, i.e., when the filter is moved out of the way or is in accurate registry with the lens. In such end positions of the filter, the carrier 52 is more or less positively coupled with the shaft 54. The resetting clutch 203 comprises an annular clutch element 69 having radially inwardly extending projections which are guided in axially extending slits 70 of the shaft 54. The clutch element 69 has two rearwardly extending teeth or prongs 71 which are received in complementary depressions or sockets 73 provided in the front face of the hub 52a whenever the carrier 52 assumes one of its end positions. The clutch element 69 is biased by a resilient element here shown as a helical expansion spring 72 which is convoluted around the front end portion of the shaft 54 and whose foremost convolution bears against a spring retainer 72a.

The resetting clutch 203 may be operated by a trigger 76 which releases the shutter mechanism (not shown) in a manner well known from the art of photographic cameras The trigger 76 resembles a rod which is reciprocable in a bore 77 provided in a bearing sleeve 77a extending from the rear side of the front wall 201. The operative connection between the trigger 76 and the clutch element 69 comprises a one-armed lever 75 the upper end of which is rockable about a fixed pivot 74 secured to the housing of the camera. The lower end portion of the lever 75 is bifurcated and straddles the clutch element 69 in front of the carrier 52. The upper portion of the lever 75 is formed with a cutout 80 for the trigger 76, and the latter is biased by a helical return spring 78 which operates between the partition 202 and the rear end face of the trigger. The trigger 76 carries a triangular rocking spring 79 which extends through the lower portion of the cutout 80 and is configured in such a way that the lever 75 is compelled to move the clutch element 69 away from the front face of the hub 52a when the trigger 76 is released and is free to return to idle position by following the bias of the return spring 78. In other words, when the trigger 76 returns to the idle or starting position shown in FIG. 4, the spring 79 automatically compels the lever 75 to withdraw the teeth 71 from the sockets 73 (against the bias of the spring 72) so that, during such withdrawal of the teeth 71, the carrier 52 is free to rotate independently of the shaft 54. When the trigger 76 is depressed and moves to operative position against the bias of the spring 78, the spring 79 causes the lever 75 to bear against the carrier 52 so that the axial position of the clutch element 69 remains unchanged and the spring 72 is free to maintain the teeth 71 in the respective sockets 73. The bias of the spring 72 is sufficiently strong to cause deformation of the spring 79 when the trigger 76 almost returns to the starting or idle position of FIG. 4 so that the spring 79 then slips through the cutout 80 and assumes the position which is actually shown in FIG. 4, i.e., the disengagement of teeth 71 from the hub 52a is only temporary and is terminated when the trigger reassumes its idle position.

The means for automatically returning the carrier 52 to one of its end positions when the resetting clutch 203 disengages the hub 52a from the shaft 54 comprises two helical resetting springs 83, 84 which are mirror symmetrical with reference to the pointer 62 and which are respectively attached to two projections or fingers 81, 82 provided on the dial 65 of the carrier 52. When the parts 63, 65 respectively assume the solid-line positions shown in FIG. 3, the bias of the spring 83 is the same as that of the spring 84. In FIG. 3, the end portion 63 of the pointer 62 registers with the symbol T which is adjacent to the arcuate window 64, and the carrier 52 maintains the filter in front of the lens, i.e., the film chamber of the camera is assumed to contain a daylight magazine 14. If the magazine 14 is removed, or if the film chamber accommodates a lamplight magazine, the end portion 63 will move to the phantom-line position 63' of FIG. 3 and the carrier 52 will automatically move the filter away from registry with the lens. In each such position of the end portion 63, the bias of the springs 83, 84 is identical and, therefore, the angular position of the hub 52a with reference to the shaft 54 will not change even if the teeth 71 are withdrawn from the respective sockets 73. In other words, as long as the angular position of the carrier 52 is in the same as that indicated by the end portion 63 of the pointer 62, the resetting clutch 203 is ineffective because the bias of the spring 83 is then fully balanced by the bias of the spring 84 and the carrier 52 will not turn with reference to the shaft 54 even though the trigger 76 is released and can return to idle position by following the bias of the return spring 78. The pointer 62 can be said to constitute an anchoring member which is connected with the filter (via carrier 52) and whose position is indicative of the type of magazine in the film chamber.

If the film chamber of the camera shown in FIGS. 3 and 4 contains a daylight magazine 14, i.e., when the sensing pin 57 is depressed against the bias of the return spring 61, the stud 58 automatically causes the shaft 54 to turn the carrier 52 to such end position that the filter is located in front of the lens. At the same time, the end portion 63 of the pointer 62 assumes the solid-line position of FIG. 3 and registers with the symbol T below the window 64. The dial 65 then places the symbol 67 into registry with the window 66 and this symbol 67 also includes the letter T which is indicative of a daylight magazine.

By removing the daylight magazine 14 from the film chamber, the user allows the spring 61 to expand whereby the sensing pin 57 moves in a direction to the right, as viewed in FIG. 4, and causes the shaft 54 to turn in a clockwise direction, as viewed in FIG. 3, namely, in a sense to move the filter out of registry with the lens. At the same time, the sensing pin 57 causes the end portion 63 of the pointer 62 to assume the phantom-line position 63' in which it registers with the symbol K below the window 64. The dial 65 moves its symbol 68 into registry with the window 66, and this symbol 68 also comprises the letter K so that the user knows that the filter is not in front of the lens. During turning of the sensing pin 57 and shaft 54, the carrier 52 is compelled to share such angular movement because the teeth 71 of the clutch element 69 extend into the corresponding sockets 73 of the hub 52a. The angular position of the sensing pin 57, of the shaft 54 and of the carrier 52 remains unchanged if the user thereupon decides to insert a lamplight magazine because such magazine cannot cause axial movement of the sensing pin.

However, if the user decides to take pictures in artificial light while the film chamber contains a daylight magazine 14 which latter causes the carrier 52 to maintain the filter in front of the lens, the tip 53 of the carrier 52 must be shifted by hand so that the carrier turns in a clockwise direction, as viewed in FIG. 3, and the dial 65 places the symbol 68 into registry with the window 66. Of course, the end portion 63 of the pointer 62 remains in the solid-line position of FIG. 3 because the sensing pin 57 is depressed by the flat portion 22 of the front panel 15 on the daylight magazine. During such manual shifting of the tip 53, the user must overcome the bias of the spring 72 which tends to maintain the teeth 71 in the sockets 73. The shifting requires relatively little force because the heads of teeth 71 are preferably rounded and because the sockets 73 are preferably bounded by surfaces of substantially semispherical shape with smooth transition into the front face of the hub 52a. The user will hear a readily detectable click when the teeth 71 snap into the sockets 73 after the carrier 52 is turned sufficiently to move the filter out of registry with the lens.

A movie camera will take a single picture or a series of pictures in response to each depression of the trigger 76. When the trigger 76 is released and follows the bias of the return spring 78, the spring 79 rocks the lever 75 in a clockwise direction, as viewed in FIG. 4, and withdraws the teeth 71 from the sockets 73 whereby the resetting spring 83 automatically turns the carrier 52 in a counterclockwise direction, as viewed in FIG. 3, and returns the symbol 67 into registry with the window 66. This will be readily understood since, when the tip 53 is turned manually to move the carrier 52 in a clockwise direction, as viewed in FIG. 3, the resetting spring 83 stores energy because the finger 81 moves away from the pointer 62 while, at the same time, the finger 82 approaches the pointer 62 and allows the other resetting spring 84 to contract. Shortly before the trigger 76 returns to the solid-line idle position of FIG. 4, the spring 79 slips through the cutout 80 and allows the spring 72 to snap the teeth 71 into the adjacent sockets 73 so that the carrier 52 is again properly coupled with the shaft 54 and with the sensing pin 57 in an angular position which corresponds to the type of magazine in the film chamber. It will be noted that the resetting spring 83 can return the carrier 52 into the solid-line position of FIG. 3 because the angular position of the pointer 62 remains unchanged when the user decide to apply force against the tip 53 and to change the angular position of the carrier in a sense to set the camera for operation in artificial light while the film chamber accommodates a daylight magazine 14.

The situation is analogous when the film chamber contains a lamplight magazine and the user decides to take pictures in daylight. When the film chamber contains a lamplight magazine, the end portion 63 of the pointer 62 is held in the phantom-line position 63' of FIG. 3 and the symbol 68 on the dial 65 of the carrier 52 is located behind the upper window 66. All that an operator has to do to use the camera in daylight is to engage the tip 53 and to turn the carrier 52 in a counterclockwise direction, as viewed in FIG. 3, whereby the the end portion 63 of the pointer 62 remains in the phantom-line position 63' but the dial 65 moves the symbol 67 behind the upper window 66 with the result that the resetting spring 84 stores energy and the other resetting spring 83 contracts. The operator then depresses the trigger 76 to make one or more exposures. As soon as the trigger 76 is released and follows the bias of the return spring 78, the spring 79 rocks the lever 75 in a clockwise direction, as viewed in FIG. 4, and withdraws the teeth 71 from the sockets 73. The carrier 52 is disengaged from the shaft 54 and follows the bias of the extended resetting spring 84 to return the symbol 68 behind the upper window 66 with the result that the filter moves out of registry with the lens.

As stated before, the trigger 76 automatically releases the shutter mechanism of the camera when it advances to operative position by moving in a direction to the right, as viewed in FIG. 4. The spring 79 may be replaced by a differently configured spring as long as it can temporarily pivot the lever 75 in a clockwise direction when the trigger 76 moves under the action of the return spring 78.

A very important advantage of the resetting clutch 203 is that the user is less likely to make a mistake because the carrier 52 (and hence the filter which is mounted on this carrier) automatically assumes such angular position which corresponds to the type of magazine in the film chamber and which was selected by the motion transmitting assembly. Such automatic resetting of the carrier 52 takes place in response to release of the trigger 76 which means that, though the user must turn the tip 53 each time he wishes to make daylight exposures while the film chamber contains a lamplight magazine or to make exposures in artificial light while the film chamber contains a daylight magazine 14, the user need not reset the carrier 52 excepting prior to making an exposure and only if he wishes to work in daylight with a lamplight magazine or vice versa. It is obvious that the resetting clutch 203 may be operated by a movable member other than the trigger 76 as long as such member moves with the trigger, at least at such times when the trigger is free to follow the bias of the return spring 78. It is further obvious that, though the drawings show two modifications of a movie camera, the invention may be embodied in still cameras which normally utilize film for exposure in artificial light and whose film chamber may accommodate two types of film cartridges.

Unless specifically recited in the claims, the carrier 25 or 52 is considered to form part of the filter 21.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the following claims.

What is claimed as new and desired to be protected by Letters Patent is:

1. In a photographic camera for use with lamplight film which is furnished in two types of magazines both of which contain the same kind of lamplight film and one of which is intended to be used for lamplight exposure and the other of which is intended to be used for daylight exposure with a filter in front of said other magazine, a housing defining a film chamber arranged to accommodate a supply of film and having a light-admitting aperture; a single corrective filter movable between two positions in front of and away from registry with said aperture; means for biasing said filter away from registry with said aperture; means for moving said filter in front of said aperture against the opposition of said biasing means in response to insertion of one type of magazine into said chamber, said biasing means being normally free to move the filter away from registry with said aperature in response to removal of said one type of magazine and while said chamber accommodates the other type of magazine; and manually operable means installed on said housing for moving the filter between said positions at the will of the user.

2. In a movie or still camera for use with lamplight film which is furnished in daylight and lamplight magazines, a housing defining a film chamber arranged to accommodate a magazine containing a supply of lamplight film and having a light-admitting aperture; a single corrective filter movable between two positions in front of and away from registry with said aperture; biasing means for urging said filter away from registry with said apertures; means for moving said filter in front of said aperture against the opposition of said biasing means in response to insertion of a daylight magazine into said chamber, said biasing means being normally free to move the filter away from registry with said aperture in response to removal of daylight magazine and while said chamber accommodates a lamplight magazine; and manually operable means installed on said housing for moving the filter between said positions at the will of the user so that the filter may be moved into or away from registry with said aperture regardless of the type of magazine in said chamber.

3. In a photographic camera for use with lamplight film which is furnished in two types of magazine, a housing defining a film chamber arranged to accommodate a supply of film and having a light-admitting aperture; a single corrective filter movable between two positions in front of and away from registry with said aperture; biasing means for urging said filter away from registry with said aperture; motion transmitting means for automatically moving said filter into registry with said aperture against the opposition of said biasing means in response to insertion of one type of magazine into said chamber, including a shaft rotatably mounted in said housing, a carrier normally rotatable with said shaft and connected with said filter so that the filter moves between said positions in response to angular movement of the carrier about the axis of said shaft, and sensing means operatively connected with and arranged to rotate said shaft with said carrier in response to insertion of said one type of magazine, said biasing means being normally free to move said filter away from registry with said aperture by way of said carrier in response to removal of said one type of magazine and while said chamber accommodates the other type of magazine; and manually operable actuating means installed on said housing for rotating said carrier with reference to said shaft independently of said sensing means and said biasing means so that said filter may be moved into and away from registry with said aperture regardless of the type of magazine in said chamber.

4. In a photographic camera for use with lamplight film which is furnished in two types of magazine, a housing defining a film chamber arranged to accommodate a supply of film and having a light-admitting aperture; a single corrective filter movable between two positions in front of and away from registry with said aperture; biasing means for urging said filter away from registry with said aperture; motion transmitting means for automatically moving said filter into registry with said aperture against the opposition of said biasing means in response to insertion of one type of magazine into said chamber, including a shaft rotatably mounted in said housing, a carrier normally rotatable with said shaft and connected with said filter so that the filter moves between said positions in response to angular movement of the carrier about the axis of said shaft, and sensing means operatively connected with and arranged to rotate said shaft with said carrier in response to insertion of said one type of magazine, said biasing means being normally free to move said filter away from registry with said aperture by way of said carrier in response to removal of said one type of magazine and while said chamber accommodates the other type of magazine; and manually operable actuating means installed on said housing for rotating said carrier with reference to said shaft independently of said sensing means and said biasing means so that said filter may be moved into and away from registry with said aperture regardless of the type of magazine in said chamber, said actuating means comprising a projection rigid with said carrier and extending from said housing.

5. In a photographic camera for use with lamplight film which is furnished in two types of magazines, a housing defining a film chamber arranged to accommodate a supply of film and having a light-admitting aperture; a corrective filter movable between two positions in front of and away from registry with said aperture; motion transmitting means for automatically moving said filter into registry with said aperture in response to insertion of one type of magazine into said chamber, including a shaft rotatably mounted in said housing, a carrier normally rotatable with said shaft and connected with said filter so that the filter moves between said positions in response to angular movement of the carrier about the axis of said shaft, sensing means including a pin axially movably coupled for rotation with said shaft and arranged to move axially in response to insertion of said one type of magazine, and means for rotating said pin in response to axial movement thereof whereby said shaft rotates said carrier, said one type of magazine having a portion which effects axial movement of said pin during insertion of such magazine into said chamber; and manually operable actuating means for rotating said carrier with reference to said shaft independently of said sensing means so that said filter may be moved into and away from registry with said aperture regardless of the type of magazine is said chamber, said actuating means comprising a project rigidly secured to said carrier and extending from said housing.

6. A structure as set forth in claim 5, wherein said pin is movable between two axially spaced end positions and wherein said pin moves from one to said end positions to the other end position in response to insertion of said one type of magazine, said motion transmitting means further comprising resilient means for biasing said pin to said one end position.

7. In a photographic camera for use with lamplight film which is furnished in daylight and lamplight magazines, a housing defining a film chamber arranged to accommodate a supply of film and having a light-admitting aperture; a corrective filter movable between two positions in front of and away from registry with said aperture; motion transmitting means for automatically moving said filter into registry with said aperture in response to insertion of a daylight magazine into said chamber, including a shaft rotatably mounted in said housing and having an end portion provided with a transverse slot, a carrier normally rotatable with said shaft and connected with said filter so that the filter moves between said positions in response to rotation of said carrier about the axis of said shaft, a rotary sensing pin having a rear end portion normally extending into said chamber and a front end portion axially movably extending into said slot, a radially extending stud secured to said sensing pin and axially movably received in said slot, and coupling means for rotating said pin in response to axial movement thereof whereby said stud rotates the shaft and the carrier to move the filter between said positions, said daylight magazine having a portion which effects axial movement of said sensing pin during insertion of such magazine into said chambers; and manually operable actuating means for rotating said carrier with reference to said shaft independently of said sensing pin so that said filter may be moved into and away from registry with said aperture regardless of the type of magazine in said chamber.

8. A structure as set forth in claim 7, wherein said shaft comprises a median portion provided with a blind bore which communicates with said slot and wherein said sensing pin comprises a front portion which is slidably received in said blind bore, said motion transmitting means further comprising a spring accommodated in said blind bore and arranged to bias said sensing pin into said film chamber.

9. In a photographic camera for use with lamplight film which is furnished in daylight magazines and lamplight magazines, a housing defining a film chamber arranged to accommodate a magazine having a light-admitting aperture; a single corrective filter movable between two positions in front of and away from registry with said aperture; biasing means for urging said filter away from registry with said aperture; motion transmitting means for moving said filter in front of said aperture against the opposition of said biasing means in response to insertion of a daylight magazine into said chamber, said biasing means being normally free to maintain said filter away from registry with said aperture when said chamber accommodates a lamplight magazine; manually operable means permanently installed on said housing for moving the filter between said positions at the will of the user; and indicating means for indicating the actual position of said filter with reference to said aperture.

10. In a photographic camera for use with lamplight film which is furnished in daylight magazines and lamplight magazines, a housing defining a film chamber arranged to accommodate a magazine having a light-admitting aperture; a single corrective filter movable between two positions in front of and away from registry with said aperture; biasing means for urging said filter away from registry with said aperture; motion transmitting means for moving said filter in front of said aperture against the opposition of said biasing means in response to insertion of a daylight magazine into said chamber, said biasing means being normally free to maintain said filter away from registry with said aperture when said chamber accommodates a lamplight magazine; manually operable means installed on said housing for moving the filter between said positions at the will of the user; and indicating means for indicating the type of magazine in said chamber.

11. In a photographic camera for use with lamplight film which is furnished in daylight magazines and lamplight magazines, a housing defining a film chamber arranged to accommodate a magazine and having a light-admitting aperture; a single corrective filter movable between two positions in front of and away from registry with said aperture; biasing means for urging said filter away from registry with said aperture; motion transmitting means for moving said filter in front of said aperture against the opposition of said biasing means in response to insertion of a daylight magazine into said chamber, said biasing means being normally free to maintain said filter away from registry with said aperture when said chamber accommodates a lamplight magazine; manually operable means installed on said housing for moving the filter between said positions at the will of the user; first indicating means for indicating the actual position of said filter with reference to said aperture; and second indicating means for indicating the type of magazine in said chamber.

12. A structure as set forth in claim 11, wherein said first indicating means comprises a dial movable with said filter and a window provided in said housing in front of said dial, said dial having graduations one of which is located behind said window in each position of said filter.

13. A structure as set forth in claim 11, wherein said motion transmitting means comprises a rotary sensing member and wherein said second indicating means comprises a pointer fixed to said sensing member and having a portion located behind a window provided in said housing, said housing being further provided with visible symbols adjacent to said window and said sensing member being arranged to rotate in response to insertion of a daylight magazine whereby said portion of the pointer registers with a selected symbol on said housing.

14. In a photographic camera for use with lamplight film which is furnished in two types of magazines, a housing defining a film chamber arranged to accommodate a supply of film and having a light-admitting aperture; a corrective filter movable between two positions in front of and away from registry with said aperture; means for moving said filter in front of said aperture in response to insertion of one type of magazine into said chamber and for maintaining the filter out from registry with said aperture in response to insertion of the other type of magazine; manually operable means for moving the filter between said positions at the will of the user; and resetting means for automatically returning said filter to the position corresponding to the type of magazine in said chamber in response to completion of at least one exposure.

15. In a photographic camera for use with lamplight film which is furnished in two types of magazines, a housing defining a film chamber arranged to accommodate a supply of film and having light-admitting aperture; a corrective filter movable between two positions in front of and away from registry with said aperture; motion transmitting means for automatically moving said filter into registry with said aperture in response to insertion of one type of magazine into said chamber, including a shaft rotatably mounted in said housing, a carrier rotatably mounted on said shaft and connected with said filter so that the filter moves between said positions in response to angular movement of the carrier about the axis of said shaft, clutch means frictionally coupling said carrier to said shaft, and sensing means operatively connected with and arranged to rotate said shaft with said carrier in response to insertion of said one type of magazine; and manually operable actuating means for rotating said carrier with reference to said shaft independently of said sensing means and against the frictional force generated by said clutch means so that said filter may be moved into and away from registry with said aperture regardless of the type of magazine in said chamber.

16. In a photographic camera for use with lamp-light film which is furnished in two types of magazines, a housing defining a film chamber arranged to accommodate a magazine and having a light-admitting aperture; a corrective filter movable in front of and away from registry with said aperture; motion-transmitting means for moving said filter in front of said aperture in response to insertion into said chamber of a first type of magazine and for maintaining the filter away from registry with said aperture in response to insertion of a second type of magazine, said motion transmitting means comprising a member movable between first and second positions respectively indicating that the chamber accommodates the first and the second type of magazine; manually operable means for moving the filter in front of and away from registry with said aperture independently of said motion transmitting means; and resetting means for returning filter into the position selected by said motion transmitting means, said resetting means including two springs each connected with said member and with said filter and arranged to bias said filter in opposite directions but with equal force when the position of said filter is selected by said motion transmitting means, the bias of one of said springs exceeding the bias of the other spring when the filter is manually moved from the position which is selected by said motion transmitting means.

17. A structure as set forth in claim 16, wherein said motion transmitting means further comprises a shaft rotatably mounted in said housing and rotatably supporting said filter, and means for rotating said shaft from a first angular position to a second angular position in response to insertion of said first type of magazine, said resetting means further comprising disengageable clutch means normally coupling the filter with said shaft, said camera further comprising trigger means movable between operative and idle positions and an operative connection between said trigger means and said clutch means for disengaging said clutch means during movement of said trigger means to said idle position so that the filter is free to follow the bias of one of said resetting springs if the actual position of the filter is different from the position selected by said motion transmitting means.

18. A structure as set forth in claim 17, wherein said clutch means comprises a clutch element axially movably mounted on and rotatable with said shaft and resilient means for biasing said clutch element axially and into motion transmitting engagement with said filter, said operative connection comprising a member arranged to disengage said clutch element from said filter in response to movement of said trigger means to idle position.

19. A structure as set forth in claim 18, wherein said filter comprises a carrier which is rotatable on said shaft and is normally engaged by said clutch element, said manually operable means comprising a projection rigid with said carrier and extending from said housing so that, in turning said carrier to manually select the position of said filter, the user must overcome the bias of said resilient means.

20. In a movie or still camera for use with photographic film which is furnished in two types of magazines, a housing defining a film chamber arranged to accommodate a magazine and having a light-admitting aperture; a single corrective filter movable between two positions in front of and away from registry with said aperture; biasing means for urging said filter away from registry with said aperutre; motion transmitting means for moving said filter in front of said aperture against the opposition of said biasing means in response to insertion of one type of magazine into said chamber, said biasing means being normally free to move the filter away from registry with said aperture in response to removal of said one type of magazine and while said chamber accommodates the other type of magazine; and actuating means installed on said housing for moving the filter between said positions independently of said motion transmitting means and said biasing means.

21. In a movie or still camera for use with photographic film which is furnished in two types of magazines, a housing defining a film chamber arranged to accommodate a magazine and having a light-admitting aperture; a corrective filter movable in front of and away from registry with said aperture; motion transmitting means for moving said filter in front of said aperture in response to insertion into said chamber of a first type of magazine and for maintaining the filter away from registry with said aperture in response to insertion of a second type of magazine, said motion transmitting means comprising a member movable between first and second positions respectively indicating that the chamber accommodates the first and the second type of magazine; actuating means for moving the filter in front of and away from registry with said aperture independently of said motion transmitting means; and resetting means for returning the filter into the position selected by said motion transmitting means, said resetting means including two springs each connected with said member and with said filter and arranged to bias said filter in opposite directions but with equal force when the position of said filter is selected by said motion transmitting means, the bias of one of said springs exceeding the bias of the other spring when the filter is moved by said actuating means and assumes a position other than the position which is selected by said motion by said motion transmitting means.

References Cited
UNITED STATES PATENTS

| | | | |
|---|---|---|---|
| 2,999,443 | 9/1961 | Miyouchi | 95—10 |
| 3,208,363 | 9/1965 | Easterly | 95—11 |
| 3,309,975 | 3/1967 | Kremp | 95—10 |
| 3,314,344 | 4/1967 | Anwyl | 95—10 |

JOHN M. HORAN, *Primary Examiner.*